United States Patent
Le Ra Valec-Dupin et al.

(10) Patent No.: US 7,363,163 B2
(45) Date of Patent: Apr. 22, 2008

(54) METHOD FOR UPDATING A GEOLOGICAL RESERVOIR MODEL BY MEANS OF DYNAMIC DATA

(75) Inventors: Mickaële Le Ra Valec-Dupin, Rueil Malmaison (FR); Lin-Ying Hu, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 37 days.

(21) Appl. No.: 11/514,925

(22) Filed: Sep. 5, 2006

(65) Prior Publication Data

US 2007/0055447 A1 Mar. 8, 2007

(30) Foreign Application Priority Data

Sep. 5, 2005 (FR) ................... 05 09040

(51) Int. Cl.
*G01V 9/00* (2006.01)
(52) U.S. Cl. ...................................... 702/12
(58) Field of Classification Search ............ 702/6, 702/12, 13, 14
See application file for complete search history.

(56) References Cited

U.S. PATENT DOCUMENTS

| | | | |
|---|---|---|---|
| 6,662,109 B2 * | 12/2003 | Roggero et al. | 702/6 |
| 6,813,565 B1 * | 11/2004 | Hu et al. | 702/14 |
| 7,200,533 B2 * | 4/2007 | Hu et al. | 703/2 |
| 2006/0058965 A1 * | 3/2006 | Ricard et al. | 702/14 |

FOREIGN PATENT DOCUMENTS

| | | | |
|---|---|---|---|
| FR | 2 780 798 A | | 1/2000 |
| FR | 2 851 670 A | | 8/2004 |

OTHER PUBLICATIONS

Arenas, Eliana et al: "Semi-Automatic History Matching Using the Pilot Point Method Including Time-Lapse Seismic Data" Proc SPE Annu Tech Conf Exhib; Proceedings—SPE Annual Technical Conference and Exhibition 2001, pp. 2689-2700, XP002388010.

(Continued)

*Primary Examiner*—Donald E McElheny, Jr.
(74) *Attorney, Agent, or Firm*—Antonelli, Terry, Stout & Kraus, LLP.

(57) ABSTRACT

A method for updating a geological reservoir model by integration of dynamic data having application, for example, to petroleum reservoir development. An initial map (y) of petrophysical properties is constructed by means of a geostatistical simulator and of static data. Then an initial set of gradual pilot points ($PP_i$) and at least one complementary set of gradual pilot points ($PP_c$) are constructed. A combined set of gradual pilot points (PP(t)) is then constructed by combining these sets of gradual pilot points according to the gradual deformation method wherein at least one deformation parameter is a characteristic parameter of said pilot points (position and/or value). The initial map (y) is then modified, the deformation parameters are modified according to the dynamic data and the procedure is repeated until a stop criterion is reached and the geological reservoir model is updated by associating the map thus optimized with the grid of the model.

37 Claims, 5 Drawing Sheets

OTHER PUBLICATIONS

Galli, Alain et al: "Stochastic-Aided Design and Bayesian Updating: New Tools to Use Expert Knowledge in Quantitative Models That Incorporate Uncertainity", Proc SPE Annu Tech Conf Exhib; Proceedings—SPE Annual Technical Conference and Exhibition; 2004 SPE Annual Technical Conference and Exhibition Proceedings 2004, pp. 2603-2612, XP002388011.

Bissell, R.C. et al: "Combining Geostatistical Modelling With Gradient Information for History Matching: The Pilot Point Method", Proc SPE Annu Tech Conf Exhib; Proceedings—SPE Annual Technical Conference and Exhibition; Formation Evaulation and Reservoir Geology 1997 Society of Petroleum Engineers (SPE), Richardson, TX. USA, vol. OMEGA, No. Part 2, 1997, pp. 139-154, XP002388012.

* cited by examiner

METHOD FOR UPDATING A GEOLOGICAL RESERVOIR MODEL BY MEANS OF DYNAMIC DATA

BACKGROUND OF THE INVENTION

1. Field of the Invention

The present invention relates to a method for updating a geological reservoir model representative of the structure and of the behavior of a petroleum reservoir, by integration of dynamic data.

More particularly, the invention applies to the construction of a map associated with the geological reservoir model, representative of the static and dynamic petrophysical properties and of their spatial variabilities provides engineers a means allowing better estimation of the reserves of a petroleum reservoir and to optimize recovery by selecting a suitable production scheme.

2. Description of the Prior Art

Optimization and development of petroleum reservoirs is based on the most accurate possible description of the structure and of the behavior of the reservoir A tool is used which accounts for these two aspects in an approximate way: a geological reservoir model. A geological reservoir model best accounts for the structure and the behavior of the reservoir. The model includes a grid pattern that forms the frame of the reservoir and that has to be representative of the structure, and petrophysical property maps associated with this grid, that have to be representative of the behavior. This association assigns a petrophysical value obtained from maps to each grid cell of the model.

A petrophysical property map describes the spatial distribution or spatial structure, in an underground zone, of continuous or discrete petrophysical properties such as permeability, porosity, lithology type, . . . Conventionally, these maps are obtained from stochastic methods and are then referred to as stochastic models. In a stochastic context, the expression realization is used rather than numerical model.

The quality of the optimization and of the development of a petroleum reservoir thus directly depends on the accuracy of the stochastic realizations (petrophysical property maps). It is therefore advisable to work out stochastic realizations and therefore, more generally, reservoir models that are as coherent as possible with all the data collected (well, seismic, laboratory data, . . . ).

The data available for constraining stochastic realizations are referred to as static or dynamic. A datum is static if it corresponds to a measurement of the property modelled at a given point and if it is independent of time. Permeability measurements performed in the laboratory on rock samples or logs measured along wells are static data. A datum is dynamic if it depends on time, it is linked with the property modelled without being a direct measurement thereof. Production data and 4D seismic data, that vary with fluid flows, are dynamic data. Since the data are insufficient to allow deterministic description of the spatial distribution of the property considered, stochastic modelling techniques are most often based on geostatistical techniques, which provide a family of numerical stochastic models associated with the geological reservoir model and referred to as realizations.

In a stochastic context, data describing the geology of the medium define a random function. For a single random function, there is an infinity of possible realizations. All these realizations are however not compatible with dynamic data.

Static and dynamic data are not integrated in the same way in the stochastic realization. Integration of static data is carried out upon generation of the realization whereas integration of dynamic data goes through the solution of an inverse problem involving a flow simulator. Dealing with the inverse problem first requires defining a function referred to as objective function, or cost function, that measures the relevance of the realization or of the reservoir model proposed. In the first research work devoted to this subject, the objective function was a direct measurement of the difference between the dynamic data collected in the field and the corresponding responses obtained by simulation:

$$J(y) = \sum_i w_i (d_{sim_i} - d_{obs_i})^2$$

y is the realization considered and $J(y)$ the value of the objective function for this realization. The w are weighting coefficients. The $d_{obs}$ are the dynamic data collected and the $d_{sim}$ are the simulated corresponding responses. The quantity g is the operator that goes from the space of the non-constrained realizations to the space of the dynamic data: $d_{sim} = g(y)$. Minimizing this objective function leads to determination of a realization y that reproduces all of the dynamic data as well as possible. Unfortunately, the spatial structure of realization y thus obtained is generally no longer coherent with that of the initial realization, that is with the geologic data.

A framework more suited to the definition of the objective function is provided by the Bayesian approach. A priori information is then added to the objective function. This approach is described in the document as follows:

Tarantola, A., 1987, " Inverse Problem Theory—Methods for Data Fitting and Model Parameter Estimation"., Elsevier, Amsterdam, 613 p.

The objective function is then expressed as follows:

$$J(y) = \frac{1}{2}(g(y) - d_{obs})^t C_D^{-1}(g(y) - d_{obs}) + \frac{1}{2}(y - y_o)^t C_Y^{-1}(y - y_o)$$

The first term of the objective function deals with the likelihood constraint: it measures the difference between the dynamic data observed in the field and the equivalent data obtained by numerical simulation. The second term corresponds to the a priori constraint: it quantifies the difference between the a priori reservoir model $y_o$, deduced from the a priori geologic information, and the proposed reservoir model y. The covariance matrix $C_D$ characterizes the experimental and theoretical uncertainties, whereas $C_y$ concerns the uncertainty on the a priori model. Minimization of the objective function then provides a model y that is as close as possible to the a priori model and such that data $d^{sim}$ simulated for this model are close to the data measured in the field.

Calculation of the objective function can be difficult, notably on account of the two covariance matrices that have to be inverted. In general, the covariance matrix relative to the data is assumed to be diagonal and it is readily inverted. This hypothesis is most certainly questionable depending on the case considered, for example with the 4D seismic method, but it is not challenged here. The case of the covariance matrix relative to model y is more awkward. In fact, the dimension of a priori covariance matrix $C_y$ is the length of the vector y and calculation of its inverse is often impossible for models comprising a very large number of grid cells. To date, to simplify taking account of the a priori constraint, essentially three types of approach have been developed. The first type of approach is based on the division of covariance matrix $C_y$ into subspaces: the least influent components are disregarded, which allows the number of variables to be reduced. This technique is described in the document as follows:

Reynolds, A. C., He, N., Chu, L., and Oliver, D. S., 1995, "Reparameterization Techniques for Generating Reservoir Descriptions Conditioned to Variograms and Well-Test Pressure Data.", SPE Annual Technical Conference and Exhibition, Dallas, Tex., 22-25 October, SPE 30588, p. 609 -624.

The second type of approach is based on the mathematical modelling of errors in the parameters space by a Gaussian random function of mean zero and of exponential covariance along preferred directions. There are thus mathematical properties allowing to analytically calculate the inverse of the a priori covariance matrix. This method is described, for example, in French Patent 2,635,197 and corresponding U.S. Pat. No. 4,972,383.

Finally, the third type of approach involves geostatistical parameterization, with in particular the pilot point method introduced in the document as follows:

Marsily, G. de, 1978, "De l'identification desSystémes Hydrologiques"., Thése de Doctorat d'Etat, Université Paris VI, France.

and the gradual deformation method described in the document as follows:

Hu, L. Y., 2000, "Gradual Deformation and Iterative Calibration of Gaussian-Related Stochastic Models.", Math. Geology, v. 32, no. 1, p. 87-108.

The pilot point method was first introduced within the context of estimation prior to being extended to the conditioning of stochastic realizations by dynamic data by:

RamaRao, B. S., LaVenue, A. M., de Marsilly, G., and Marietta, M. G., 1995, "Pilot Point Methodology for Automated Calibration of an Ensemble of Conditionally Simulated Transmissivity Fields. 1. Theory and Computational Experiments.", Water Res. Res., 31(3), 475-493.

This technique allows local deformation of realizations from a reduced number of parameters while respecting the spatial variability of the property modelled (permeability, porosity, velocity, . . . ). In short, in order to modify the realization, a set of points (or cells) referred to as pilot points, whose values can be changed, is selected. The perturbation generated at these points spreads over the entire realization by kriging according to the expression:

$$y_c(x) = y_{dK}(x) + [y(x) - y_K(x)]$$

y is a non-constrained realization. The quantity $y_{dK}$ results from kriging of the static data and the values of the pilot points, and $y_K$ from kriging of the values of y at the same points. The quantity $y_c$ is a constrained realization that honors the spatial variability model and the values of the static data, as well as the values selected for the pilot points. In other words, the pilot points are regarded as static data that are used to constrain the realization. The values of the pilot points are the parameters of the optimization problem. These "pseudo"-data, unlike the real static data, are not stationary: they can vary during the optimization procedure so as to reduce the objective function. Since the modifications are propagated to the entire realization by kriging, conservation of the spatial variability model is ensured. Adding the term relative to the a priori constraint in the objective function is therefore considered to be redundant. This objective function then comes down to the single term measuring the difference between the real dynamic data and the corresponding responses obtained by simulation. It is no longer necessary to determine the inverse of the a priori covariance matrix. This property is fundamental and characteristic of the pilot point method.

However, the pilot point method can involve numerical artifacts. In some cases, minimization of the objective function goes through the assignment of extreme values to the pilot points. We can then have either too high values or too low values, which no longer make sense, physically speaking. To avoid these artifacts, constraints by inequalities can be integrated in the optimization procedure: the variations of the parameters are then bounded. This technique is described more precisely in the aforementioned document by RamaRao et al. (1995). Besides, the values of the pilot points are adjusted independently of one another. The pilot points therefore have to be separated by a distance that is greater than or equal to the correlation length. If this minimum distance is not respected, the pilot point method does not guarantee preservation of the spatial variability model.

The gradual deformation method was initially proposed to continuously modify Gaussian stochastic processes (random processes). It is a geostatistical parameterization technique allowing deformation of a realization of a reservoir, model comprising any number of grid cells from a reduced number of parameters, while respecting the spatial variability model. The basic idea is that the sum of Gaussian random functions is a Gaussian random function.

The simplest gradual deformation scheme adds up two multi-Gaussian random functions. Let $Y^1$ and $Y^2$ be two such functions, independent and stationary of order 2. They are also assumed to have the same mean $(y_o)$, variance and covariance model. A new random function Y(t) is constructed by combining $Y^1$ and $Y^2$ according to the expression as follows:

$$Y(t) - y_o = \lfloor Y^1 - y_o \rfloor \cos(t) + \lfloor Y^2 - y_o \rfloor \sin(t)$$

It can be shown that, for any deformation coefficient t, Y has the same mean, variance and spatial variability model as $Y^1$ and $Y^2$. In fact, the sum of the coefficients squared, i.e. $\cos^2(t) + \sin^2(t)$, is 1. According to this combination principle, construction, from two realizations independent of $Y^1$ and $Y^2$, denoted by $y^1$ and $y^2$, of a chain of realizations depending only on deformation parameter t is possible.

$$y(t) - y_o = \lfloor y^1 - y_o \rfloor \cos(t) + \lfloor y^2 - y_o \rfloor \sin(t)$$

This chain of realizations goes through $y^1$ and $y^2$. When t is 0, y is $y^1$. When t is $\square/2$, y is $y^2$. By continuously varying the deformation coefficient t from 0, continuous deformation of realization $y^1$ is simulated. By varying continuously deformation coefficient t from 0, continuous deformation of realization $y^1$, taken as the initial realization, is simulated. An essential point is that, for any value of t, realization y is multi-Gaussian and respects the mean, variance and spatial variability model of $y^1$ and $y^2$.

When the gradual deformation method is integrated in an optimization process as a parameterization technique, the objective function to be minimized becomes:

$$J(t) = \frac{1}{2}[g(t) - d_{obs}]^t C_D^{-1}[g(t) - d_{obs}].$$

In fact, as for the pilot point method, it seems redundant to add the a priori constraint in the objective function because parameterization intrinsically preserves the spatial variability model. Vector t combines the various deformation coefficients. These coefficients are the parameters of the optimization problem. These deformation parameters have to be identified so as to reduce the objective function as much as possible.

The gradual deformation method as presented here implies that the entire realization is deformed to minimize the objective function. However, the gradual deformation method can also be applied locally. In this case, instead of combining realizations with a given spatial variability model, the Gaussian white noises used to generate these structured realizations are combined. More precisely, when the deformation is to be located in a given zone, the components (random numbers) of the Gaussian white noise assigned to the cells included in the zone to be deformed are gradually deformed. This technique is described in the document as follows:

Le Ravalec, M., Noetinger, B., and Hu, L.-Y., 2000, "The FFT Moving Average (FFT-MA)Generator: An Efficient Numerical Method for Generating and Conditioning Gaussian Simulations.", Math. Geol., 32(6), 701-723.

If necessary, the gradual deformation method can be applied to an isolated component of the Gaussian white noise. It then tends towards the pilot point method. An important difference has to be noted: the gradual deformation method prevents the modified point from taking extreme values. Furthermore, if several points are modified according to the gradual deformation method, the spatial correlations between the deformed points are taken into account. However, the gradual deformation method is negligible when it is applied to points. An optimization procedure involving this type of parameterization will therefore probably be much less efficient than the pilot point method.

SUMMARY OF THE INVENTION

The method according to the invention allows local deformation of a realization significantly while preserving the spatial variability model.

The invention relates to a method for updating a geological reservoir model representative of the behavior of a heterogeneous porous medium and discretized in space into a set of cells forming a grid representative of the structure of the medium, allowing accounting for the dynamic data (DD) acquired by measurements and varying in the course of time according to fluid flows in the medium, the method comprising:

A) constructing an initial map (y) of petrophysical properties by means of a geostatistical simulator and of static data (SD);

B) integrating the dynamic data (DD) by optimizing the initial map by:

a) constructing an initial set of gradual pilot points ($PP_i$);

b) constructing at least one complementary set of gradual pilot points ($PP_c$);

c) constructing a combined set of gradual pilot points (PP(t)) by combining the sets of gradual pilot points ($PP_i$ and $PP_c$) according to the gradual deformation method wherein at least one deformation parameter is a characteristic parameter of said pilot points;

d) modifying the values of the petrophysical properties of the initial map (y) by constraining it by the combined set of gradual pilot points (PP(t)) and by the static data (SD);

e) modifying the combined set (PP(t)) and resuming from c) until a stop criterion is reached; and C) updating the geological reservoir model by associating the map optimized in B) with the grid of the model.

The initial and complementary sets of gradual pilot points can be constructed by means of random generations using distribution laws deduced from the values of the static data (SD).

The characteristic parameters of a pilot point can be selected from among the following parameters: its position and its associated petrophysical property value.

According to the invention, a flow simulator can be used to estimate dynamic data simulated from the petrophysical property values of the modified initial map (y). It is thus possible to compare, by means of an objective function, the simulated dynamic data and the dynamic data acquired by measurements, in order to modify the combined set and to define the stop criterion. In this embodiment, as long as the objective function is greater than a given threshold, if it does not converge, the deformation parameter can be modified and optimization can be continued in c) and, if it converges, the initial set of gradual pilot points ($PP_i$) can be replaced by the combined set of gradual pilot points (PP(t)), and the procedure can be repeated from b).

The static data can be logs and/or measurements on samples taken in wells and/or seismic data, and the dynamic data can be production data and/or well tests data and/or breakthrough time data.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

The method according to the invention updates a geological reservoir model representative of the structure and of the behavior of a heterogeneous porous medium, by integration of dynamic data. More particularly, the invention applies to the construction of a map associated with a geological reservoir model, representative of the static petrophysical properties and of the spatial variabilities thereof, coherent with the dynamic data collected in the field, such as production data or 4D seismic data.

A geological reservoir model has a grid discretizing the structure of a heterogeneous porous medium and of at least one map of petrophysical properties representative of the of this medium. A map is made up of a grid which is not necessarily the same as the grid of the geological reservoir model, each cell of which is associated with a petrophysical value. All of these values, connected by spatial relations, form a "realization". This term is used because the petrophysical property is considered to be a random variable. Various realizations of this random variable provide as many petrophysical property maps.

According to the invention, construction of such maps comprises three main stages:

Stage E1

First of all, static data (SD) such as logs, measurements on samples taken in wells, seismic data are measured in the field on the one hand and, on the other hand, dynamic data (DD) such as production data, well test data or breakthrough time data whose specific feature is to vary in the course of time according to fluid flows in the reservoir are collected in the field.

Figure 1:
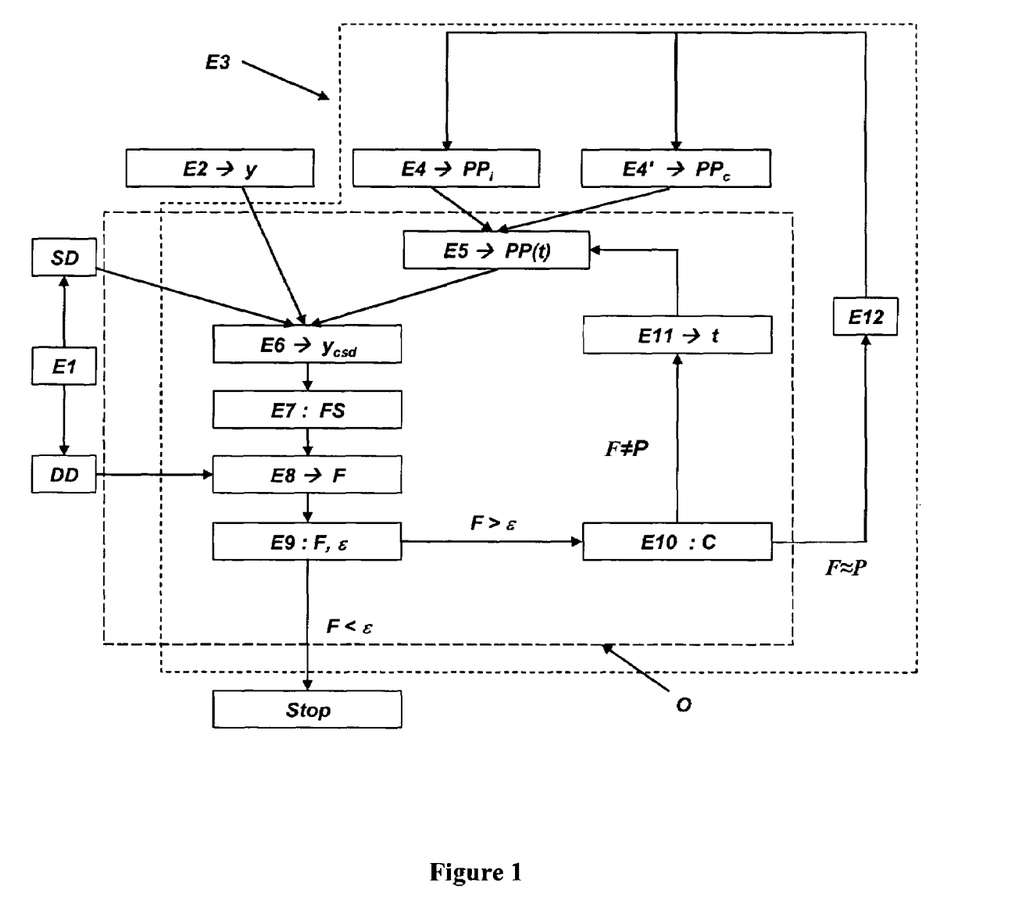
FIG. 1 diagrammatically shows the method according to the invention with deformation of a single parameter.

The spatial variabilities thereof are then analyzed by means of techniques known to specialists, such as variographic analysis. The general flowsheet of the method according to the invention is shown in FIG. 1.

Stage E2

Then, from the static data, a random function characterized by its covariance function (or similarly by its variogram), its variance and its mean is defined by means of known data analysis techniques.

Furthermore, a grid pattern and a set of random numbers drawn independently of one another are defined for each map: it can be, for example, a Gaussian white noise or uniform numbers. There is therefore an independent random number for each grid cell and for each map.

Finally, from a selected geostatistical simulator and from the set of random numbers, a random draw is carried out in the random function, which leads to a realization, continuous or discrete, representing a possible image of the petrophysical properties of the reservoir.

The associated random realization is denoted by y. It is constrained neither by the static data (SD) nor by the dynamic data (DD).

Stage E3

At this stage, the dynamic data have not been considered. They are integrated in the geological reservoir models by means of an optimization or of a calibration of the maps. An objective function measuring the difference between the dynamic data measured in the field and the corresponding responses simulated for the realization considered is defined. The goal of the optimization procedure is to gradually modify this map so as to reduce the objective function. In the end, the modified maps are coherent in relation to the static data and to the dynamic data.

This stage of the method according to the invention can be referred to as "gradual pilot point method" because it is based on an integration of the pilot point method (Marsily, G., 1978) and of the gradual deformation method (Hu, L. Y., 2000). In fact, it allows modification of a realization locally and significantly like the pilot point technique while preserving the spatial variability model like the gradual deformation technique. In this context, "gradual pilot points" are pilot points to which a gradual deformation technique is applied.

This stage comprises the following stages E4 to E12.

Stages E4 and E4'

In parallel with the generation of a realization y, an initial set of gradual pilot points denoted by $PP_i$ (stage E4) and at least one complementary set of gradual pilot points denoted by $PP_c$ (stage E4') are constructed.

The position on the map of each point is first defined. Sensitivity studies can be envisaged from gradient calculations so as to best position the pilot points on the map. It is also possible to position these points in zones where a deformation is to be provided on the map. For example, when 4D seismic data are to be integrated, it is judicious to position the points at the level of the interfaces between the fluids saturating the reservoir.

Then a petrophysical property value is associated with each pilot point. For the complementary set, an initial set of values is generated randomly and independently by following the same random function as the one used to generate y. This initial set then forms a realization. This realization associated with the complementary set of gradual pilot points can for example be produced from Cholesky's method. This method is for example described in the document as follows:

Chilés, J. P., Delfiner, P., 1999, "Geostatistics—Modeling Spatial Uncertainty, Wiley Series in Probability and Statistics", New York, USA.

Cholesky's method allows generation of multi-Gaussian realizations at points unevenly distributed in space. It is appropriate as long as the number of points is small. Beyond 1000 points, another simulation method such as the turning band method, the Gaussian sequential simulation method or the FFTMA method is preferably used.

The same methods can be used for the initial set, but it is also possible to directly use the values of initial map y.

Stage E5

Gradual pilot points $PP_i$ and $PP_c$ are then combined according to the gradual deformation method to produce a set of gradual pilot points PP(t). The basic scheme combines two sets of gradual pilot points according to the expression:

$$y_P(t)-y_o=\lfloor y_P^1-y_o\rfloor\cos(t)+\lfloor y_P^2-y_o\rfloor\sin(t)$$

The quantities $y_P^1$ and $y_P^2$ are the two sets of gradual pilot points brought back by anamorphosis, if necessary, to a normal base. In this context, the inversion parameters are checked to not be the values of the gradual pilot points themselves, but the deformation coefficient t. This formulation reduced here to the combination of two sets of gradual pilot points can be extended to the combination of N sets of gradual pilot points. In the latter case, the number of deformation parameters is brought to N-1 as shown in the document as follows:

Roggero, F., and Hu, L.-Y., 1998, "Gradual Deformation of Continuous Geostatistical Models for History Matching", SPE ATCE, 49004, New Orleans, La., USA.

The interest of combining a large number of sets of gradual pilot points is that it provides more flexibility for the optimization procedure. It is in fact easier to reduce an objective function where there are several levers for exploring the space of the sets of gradual pilot points.

The deformation parameters simultaneously affect all of the gradual pilot points. In this case, the gradual deformation is referred to as global and the spatial correlations between the pilot points are taken into account. In other words, the gradual pilot points obtained PP(t) honor the spatial variability model for any value of the deformation parameters (t).

Stage E6

After the gradual combination stage, the kriging technique is used (stage E6) to constrain realization y previously generated in stage E2, by the static data on the one hand (SD), and the set of pilot points from gradual deformation PP(t) on the other hand:

$$y_{csd}(u) = y_{dK}(u) + [y(u) - y_K(u)]$$

The quantity y is the initial realization from stage E2, $y_{dK}$ is the estimation of the kriging of the static data available and of the gradual pilot points, and $y_K$ is the estimation of the kriging of the values of y at the location of the measurements and of the pilot plants, the quantity $y_{csd}$ is the realization constrained by the static data (SD).

Stage E7

Carrying out a flow simulation FS for this constrained realization $y_{csd}$ allows a set of dynamic data to be calculated.

Stage E8

An objective function F (stage E8) is calculated from the dynamic data calculated in stage E7 and the measured dynamic data. This objective function measures the difference between the simulated data and the measured real data.

Stage E9

The value of the objective function is compared with a fixed threshold $\epsilon$. The quantity $\epsilon$ is a real number close to zero. If objective function F is small enough, that is, if F is less than the fixed value $\epsilon$, the minimum seeking procedure stops (STOP). In the opposite case, two situations can be considered.

Stage E10

These two situations depend on the convergence of objective function F. Thus, in stage E10, it is determined if the objective function converges towards a plateau value denoted by P or not. Thus, according to the convergence (C) or not of objective function F, stage E11 or stage E12 is carried out:

Stage E11

If the objective function has not converged, the optimization O in progress is continued by varying the deformation parameters. The parameters of the successive optimizations O are the deformation parameters. Their number is equal to the number of sets of complementary pilot points. The number of parameters can thus be greatly reduced.

Stage E12

Although the objective function F is still great (greater than $\epsilon$), it has converged towards a plateau P. The deformation parameters such as parameter t determined so far are considered to be optimum parameters and they are used to update the initial set of initial gradual pilot points $PP_i$. Then a new complementary set of pilot points $PP_c$ is drawn at random (stage E4'). A new optimization O of the deformation parameters is then launched (stages E5 to E11).

Since the deformation of the gradual pilot points is global, that is the pilot points are simultaneously modified from the same deformation parameters, the deformed pilot points honour the spatial variability model. This property is important. It allows positioning of the gradual pilot points as one wishes to on the realization. It is not necessary to respect a minimum distance between these points.

In short, the parameters adjusted to minimize the objective function are the deformation parameters ensuring combination of the pilot points rather than the values of the pilot points themselves. In other words, the values of the pilot points are no longer directly governed by the optimizer. The gradual deformation method is used as an intermediary between the pilot points and the optimizer. Thus, during the optimization procedure, the optimizer modifies the gradual deformation coefficients which control the values of the pilot points.

Second Embodiment

According to a second embodiment, the method according to the invention can be extended by integrating in the objective function a gradual deformation parameter (p) controlling the position of the gradual pilot points. The position of the gradual pilot points is modified by varying this parameter.

In this embodiment, not only the values of the two sets of initial gradual pilot points ($PP_i$ and $PP_c$), but also their positions are considered. These positions correspond to uniform numbers that are converted to Gaussian numbers:

$$Y = G^{-1}(x)$$

where G is the standard normal distribution function, x is the position vector of the pilot point and Y is its associate in the standard normal base. Two possible positions $x_1$ and $x_2$ of pilot points can be gradually combined according to the expression:

$$x(p) = G[G^{-1}(x_1)\cos(p) + G^{-1}(x_2)\sin(p)]$$

The quantity p is the deformation parameter. Variation of the deformation parameter modifies the position of the pilot point. This method was introduced in the document as follows:

Hu, L.-Y., 2000, Geostats 2000 Cape Town, W J Kleingeld and D G Krige (eds.), 1, 94-103.

Thus, during the optimization procedure, one can try to estimate optimum deformation parameter p, that is the position of the pilot points, by reducing the objective function as much as possible.

Other Embodiment

Figure 2:
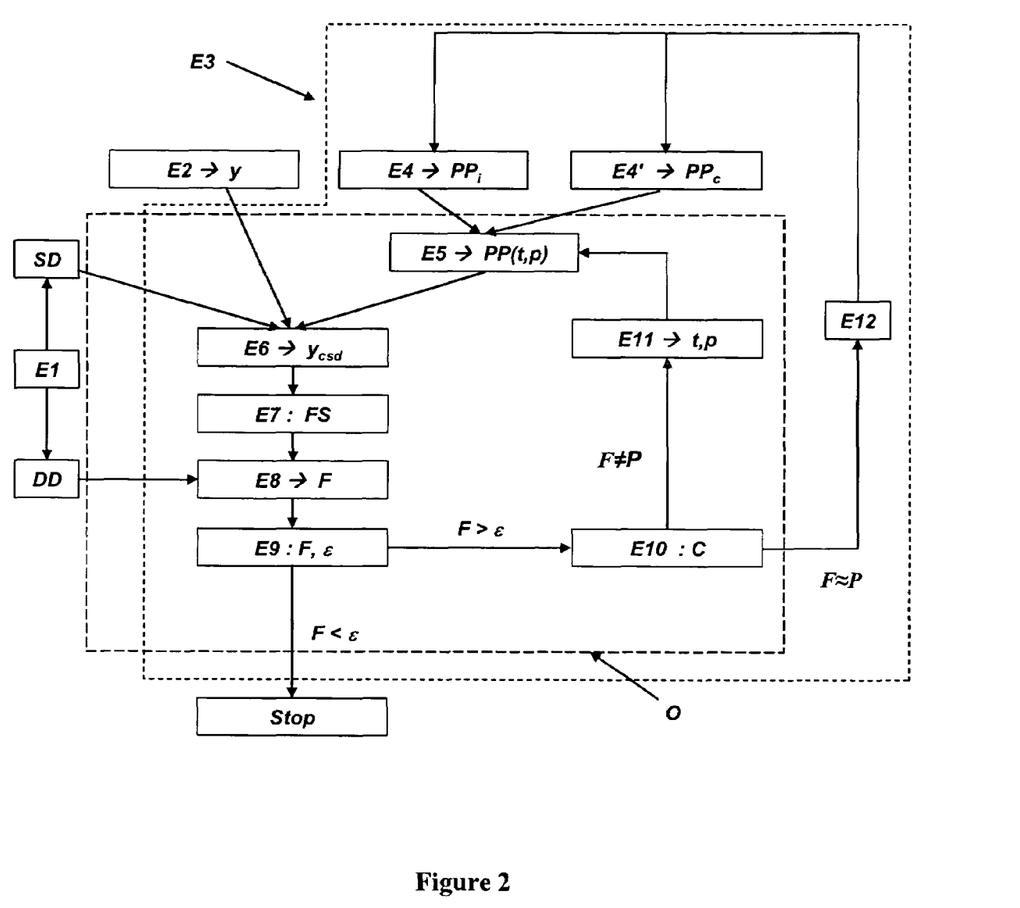
FIG. 2 diagrammatically shows the method according to the invention with deformation of several parameters.

It is also possible, according to another embodiment of the invention, to try to simultaneously estimate optimum deformation parameters p and t as illustrated in FIG. 2.

APPLICATION EXAMPLE

Figure 3:
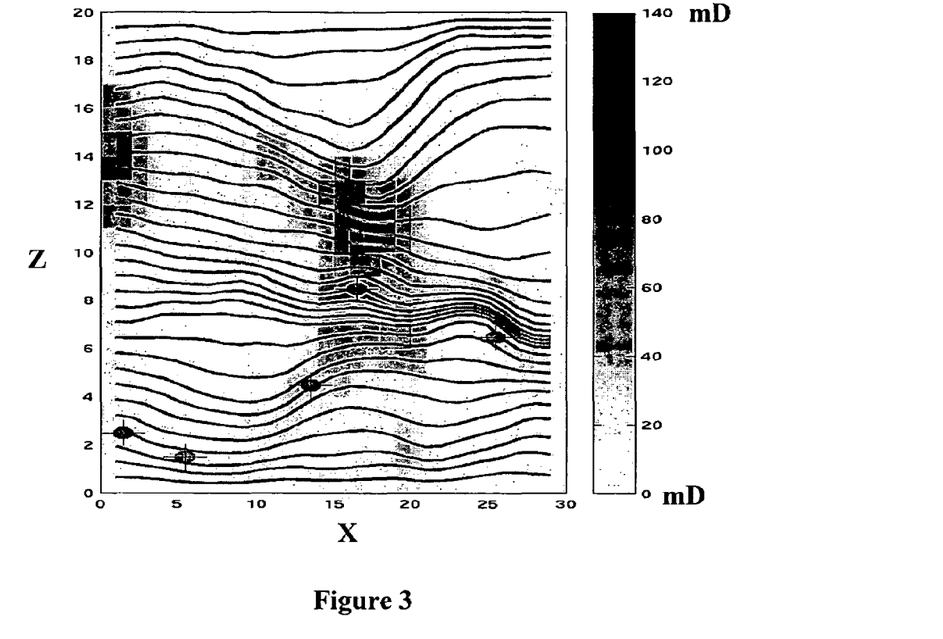
FIG. 3 shows a reference permeability field and flow lines. The positions where permeability values are known are shown by circles with superposed crosses.
Figure 4:
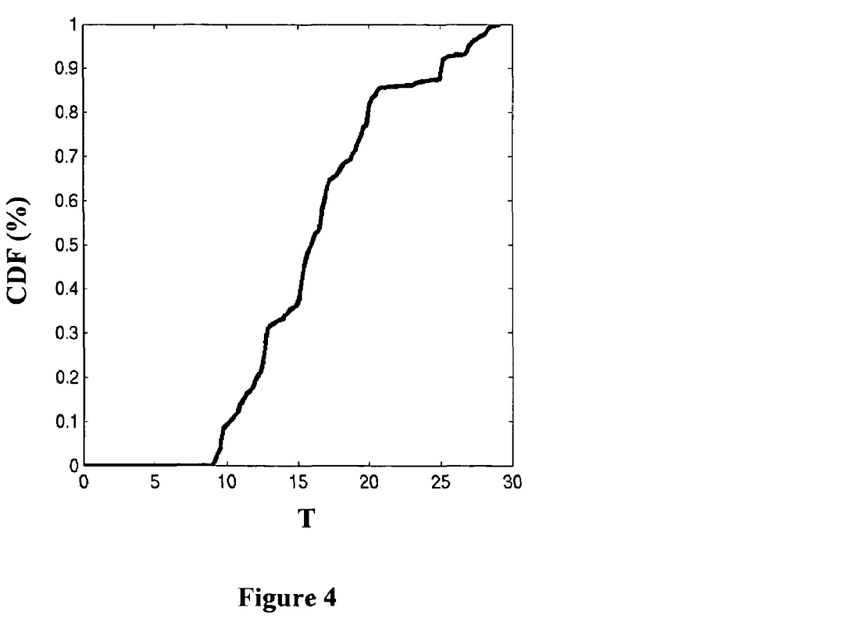
FIG. 4 illustrates a distribution function (CDF) of the times (T) taken by the particles to run through the medium.
Figure 5A:
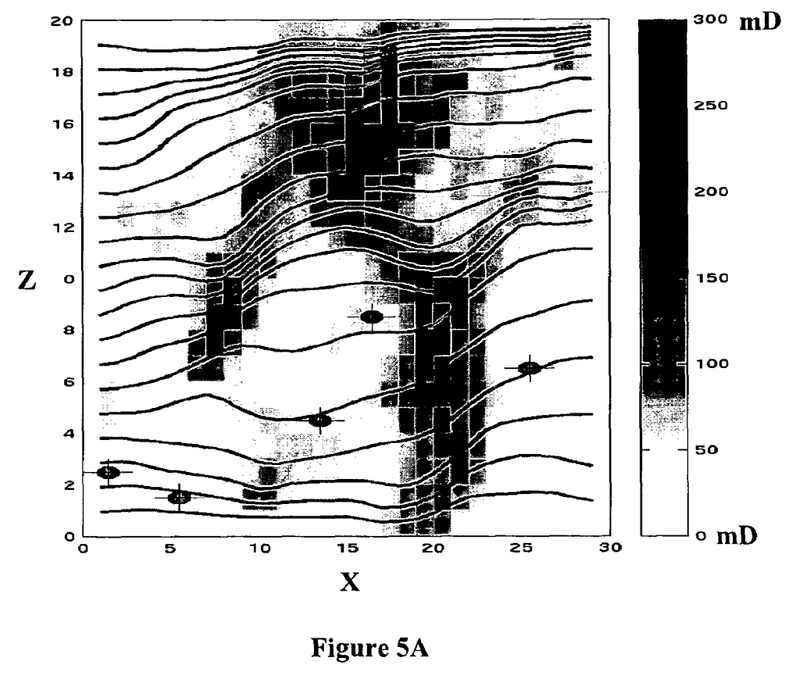
FIG. 5A shows an initial realization.
Figure 5B:
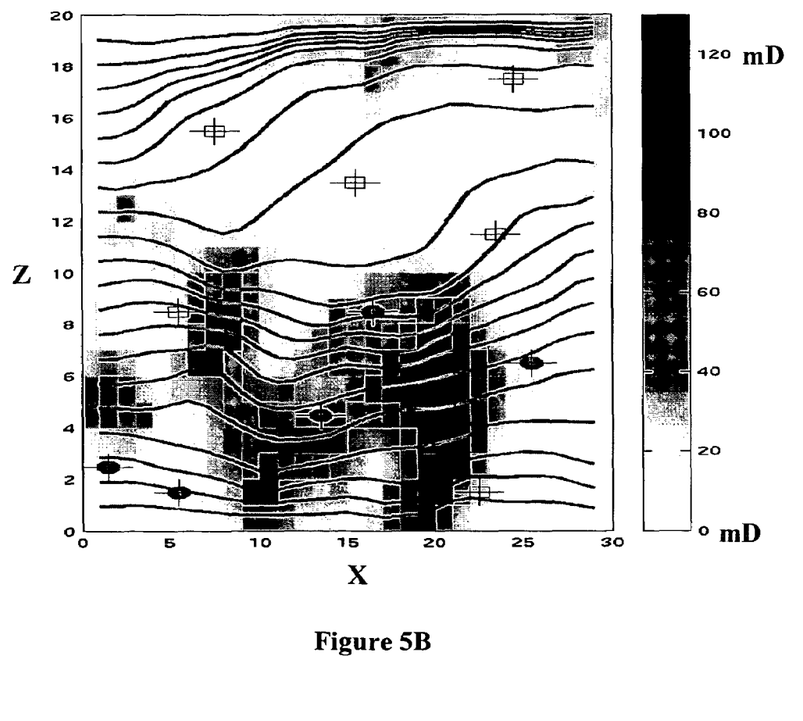
FIG. 5B shows a realization constrained by the dynamic data from the pilot point method.
Figure 5C:
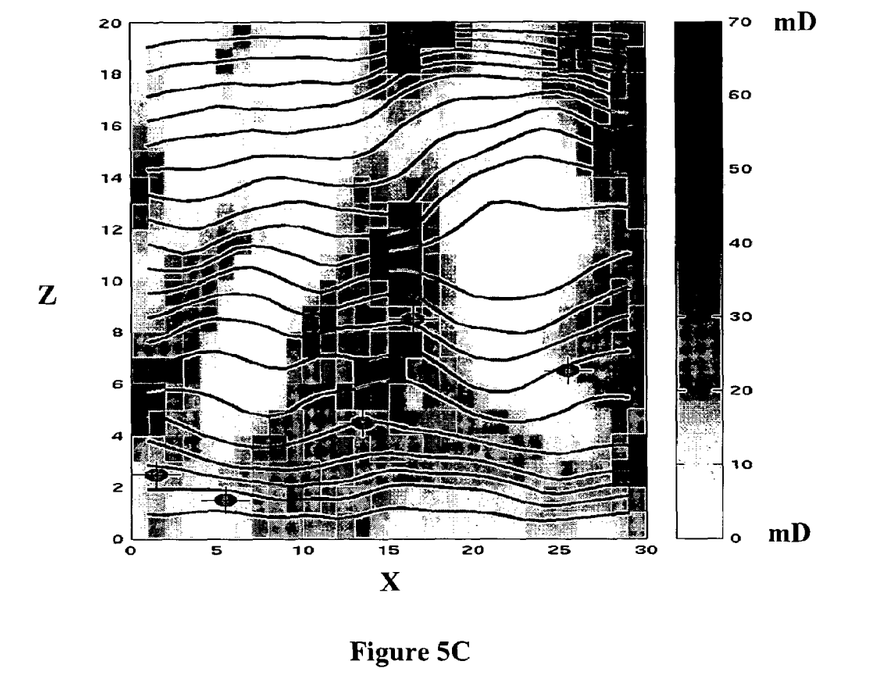
FIG. 5C shows a realization constrained by the dynamic data from the global gradual deformation method.
Figure 5D:
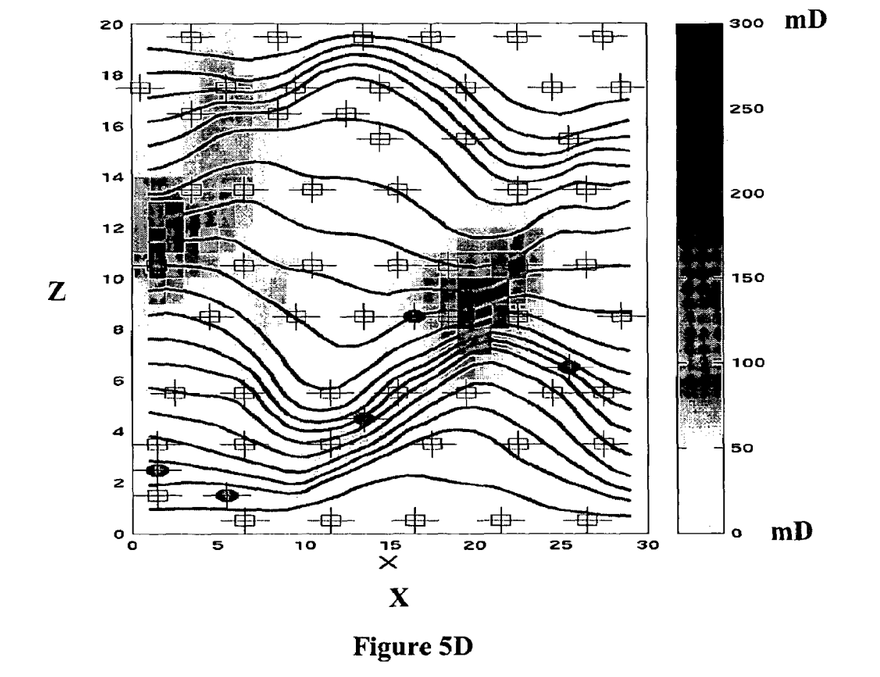
FIG. 5D shows a realization constrained by the dynamic data from the gradual pilot point method. The position of the pilot points is shown by a square with a superposed cross.

The following example illustrates the efficiency of the method developed. This example is limited to the deformation of the pilot point values (deformation parameter t, FIG. 1). FIG. 3 shows a synthetic permeability map (field) k discretized with a 30-cell grid in direction X and 20 cells in direction Z. The size of the cell is 1 m×1 m. The distribution is lognormal; the mean and the variance of ln(k) are 3 and 1 respectively. The spatial variability of ln(k) is apprehended by a spherical isotropic variogram of correlation length 10 m. For this reference synthetic map, a tracer injection experiment is numerically simulated: inert particles are injected on the left side of the map and produced on the right side. The dynamic data is obtained referred to as reference data, which are the distribution function (CDF) of the times (T) taken by the particles injected to flow through the medium, as illustrated in FIG. 4, where the time T is given in days. The reference permeability map is now assumed not to be known. The only available information for characterizing the permeability map is given by the mean, the variance, the spatial variability model, the permeability measured at five points identified by circles on which crosses are superposed, and the distribution function of the travel times. The permeability map shown in FIG. 5A is now considered as the initial point of the investigation process. This map is coherent in relation to the statistical properties and the five permeability measurements, but not in relation to the travel times. It therefore has to be deformed to ensure also reproduction of the travel times. The pilot point method, the gradual deformation method and the method according to the invention (gradual pilot point method) are then applied to improve calibration of the travel times. Every time, the start point is from the same initial point. The permeability maps obtained at the end of the calibration, that is at the end of the optimization procedure, are shown in FIGS. 5B, 5C and 5D for each method. For the pilot point method (FIG. 5B), 6 pilot points are positioned; they are symbolized by squares with superposed crosses. It can be recalled that the pilot points must be separated by at least a correlation length, which limits the number of possible points. It can be seen that the constrained permeability map has been essentially modified at the top (FIG. 5B). Besides, within the context of the pilot point method, there is one parameter per pilot point. Six parameters are thus used here. For the gradual deformation method (FIG. 5C) and the method according to the invention (FIG. 5D), a single parameter is considered. The entire permeability map was modified during the optimization procedure. For the gradual deformation method (FIG. 5C), this result is natural because the deformation was of global type. For the method according to the invention (FIG. 5D), taking account of the spatial correlations between gradual pilot points allows positioning of as many such points as desired on the permeability map. Finally, the efficiency of the deformation techniques used is evaluated in terms of number of flow simulations for reducing the objective function by 95% (Table 1). The objective function is defined here as the difference squared between the simulated travel times and the reference travel times. For the pilot point method, the case studied requires carrying out about a hundred flow simulations to reduce the objective function by 95%. In parallel, the gradual deformation method involves carrying out about fifty flow simulations whereas the method according to the invention only requires about 20 such simulations.

TABLE 1

Number of flow simulations carried out to reduce the objective function by 95%

| Deformation method | Number of flow simulations |
|---|---|
| Pilot points | 100 |
| Gradual deformation | 50 |
| Gradual pilot points | 20 |

The method according to the invention thus allows updating a geological reservoir model representative of the structure and of the behaviour of a heterogeneous porous medium, by integrating static and dynamic petrophysical properties in the definition of the associated maps. The method comprises parameterization which allows dynamic data to be integrated by deforming locally and efficiently an initial map so as to make it coherent in relation to a set of dynamic data while preserving the spatial structure of the realization. The spatial correlations between the gradual pilot points are taken into account. It is thus possible to position as many pilot points as desired on a petrophysical property map; it is not necessary to respect a minimum distance between the points. Furthermore, this method does not require constraining the values of the pilot points by inequalities.

Finally, the objective function variations are controlled from a small number of parameters (the number of parameters is not the number of pilot points). If necessary, the objective function is minimized by adjusting a single deformation parameter.

The method thus provides engineers with means for integrating dynamic data in order to predict the dynamic behavior of a petroleum reservoir.

The invention claimed is:

1. A method for updating a geological reservoir model representative of the behavior of a heterogeneous porous medium and discretized in space into a set of cells forming a grid representative of structure of the medium, allowing accounting for dynamic data acquired by measurements and varying in time according to fluid flows in the medium, the method comprising:
    A) constructing an initial map of petrophysical properties by means of a geostatistical simulator and of static data; and
    B) integrating the dynamic data (DD) by optimizing the initial map by carrying out:
        a) constructing an initial set of gradual pilot points;
        b) constructing at least one complementary set of gradual pilot points;
        c) constructing a combined set of gradual pilot points by combining the sets of gradual pilot points according to a gradual deformation method wherein at least one deformation parameter is a characteristic parameter of the pilot points;
        d) modifying values of petrophysical properties of the initial map by constraint by the combined set of gradual pilot points and by the static data;
        e) modifying the combined set and resuming from c) until a stop criterion is reached; and
    C) updating the geological reservoir model by associating the map optimized in B) with the grid of the model.

2. A method as claimed in claim 1, wherein initial and complementary sets of gradual pilot points are constructed by means of random generations using distribution laws deduced from the values of static data.

3. A method as claimed in claim 1, wherein characteristic parameters of a pilot point are selected from among parameters: position and associated petrophysical property value.

4. A method as claimed in claim 1, wherein a flow simulator is used to estimate the dynamic data simulated from the petrophysical property values of the modified initial map, and a comparison is performed, by means of an objective function, between the simulated dynamic data and the dynamic data acquired by measurement, so as to modify the combined set and to define the stop criterion.

5. A method as claimed in claim 4 wherein, when the objective function is greater than a given threshold, if the objective function does not converge, the deformation parameter is modified and optimization is continued in c) and, if the objective function converges, the initial set of gradual pilot points is replaced by the combined set of gradual pilot points, and the procedure is repeated from b).

6. A method as claimed in claim 1, wherein the static data are at least one of logs, measurements on samples taken in at least one of wells and seismic data.

7. A method as claimed in claim 1, wherein the dynamic data are at least one of production data, well test data and breakthrough time data.

8. A method as claimed in claim 2, wherein characteristic parameters of a pilot point are selected from among parameters: position and associated petrophysical property value.

9. A method as claimed in claim 2, wherein a flow simulator is used to estimate the dynamic data simulated from the petrophysical property values of the modified initial map, and a comparison is performed, by means of an objective function, between the simulated dynamic data and the dynamic data acquired by measurement, so as to modify the combined set and to define the stop criterion.

10. A method as claimed in claim 3, wherein a flow simulator is used to estimate the dynamic data simulated from the petrophysical property values of the modified initial map, and a comparison is performed, by means of an objective function, between the simulated dynamic data and the dynamic data acquired by measurement, so as to modify the combined set and to define the stop criterion.

11. A method as claimed in claim 8, wherein a flow simulator is used to estimate the dynamic data simulated from the petrophysical property values of the modified initial map, and a comparison is performed, by means of an objective function, between the simulated dynamic data and the dynamic data acquired by measurement, so as to modify the combined set and to define the stop criterion.

12. A method as claimed in claim 2, wherein the static data are at least one of logs, measurements on samples taken in at least one of wells and seismic data.

13. A method as claimed in claim 3, wherein the static data are at least one of logs, measurements on samples taken in at least one of wells and seismic data.

14. A method as claimed in claim 4, wherein the static data are at least one of logs, measurements on samples taken in at least one of wells and seismic data.

15. A method as claimed in claim 5, wherein the static data are at least one of logs, measurements on samples taken in at least one of wells and seismic data.

16. A method as claimed in claim 8, wherein the static data are at least one of logs, measurements on samples taken in at least one of wells and seismic data.

17. A method as claimed in claim 9, wherein the static data are at least one of logs, measurements on samples taken in at least one of wells and seismic data.

18. A method as claimed in claim 10, wherein the static data are at least one of logs, measurements on samples taken in at least one of wells and seismic data.

19. A method as claimed in claim 11, wherein the static data are at least one of logs, measurements on samples taken in at least one of wells and seismic data.

20. A method as claimed in claim 2, wherein the dynamic data are a least one of production data, well test data and breakthrough time data.

21. A method as claimed in claim 2, wherein the dynamic data are at least one of production data, well test data and breakthrough time data.

22. A method as claimed in claim 3, wherein the dynamic data are at least one of production data, well test data and breakthrough time data.

23. A method as claimed in claim 4, wherein the dynamic data are at least one of production data, well test data and breakthrough time data.

24. A method as claimed in claim 5, wherein the dynamic data are at least one of production data, well test data and breakthrough time data.

25. A method as claimed in claim 6, wherein the dynamic data are at least one of production data, well test data and breakthrough time data.

26. A method as claimed in claim 8, wherein the dynamic data are at least one of production data, well test data and breakthrough time data.

27. A method as claimed in claim 9, wherein the dynamic data are at least one of production data, well test data and breakthrough time data.

28. A method as claimed in claim 10, wherein the dynamic data are at least one of production data, well test data and breakthrough time data.

29. A method as claimed in claim 11, wherein the dynamic data are at least one of production data, well test data and breakthrough time data.

30. A method as claimed in claim 12, wherein the dynamic data are at least one of production data, well test data and breakthrough time data.

31. A method as claimed in claim 13, wherein the dynamic data are at least one of production data, well test data and breakthrough time data.

32. A method as claimed in claim 14, wherein the dynamic data are at least one of production data, well test data and breakthrough time data.

33. A method as claimed in claim 15, wherein the dynamic data are at least one of production data, well test data and breakthrough time data.

34. A method as claimed in claim 16, wherein the dynamic data are at least one of production data, well test data and breakthrough time data.

35. A method as claimed in claim 17, wherein the dynamic data are at least one of production data, well test data and breakthrough time data.

36. A method as claimed in claim 18, wherein the dynamic data are at least one of production data, well test data and breakthrough time data.

37. A method as claimed in claim 19, wherein the dynamic data are at least one of production data, well test data and breakthrough time data.

* * * * *